E. H. ASHCROFT.
Registering Steam-Gages.
No. 141,307. Patented July 29, 1873.
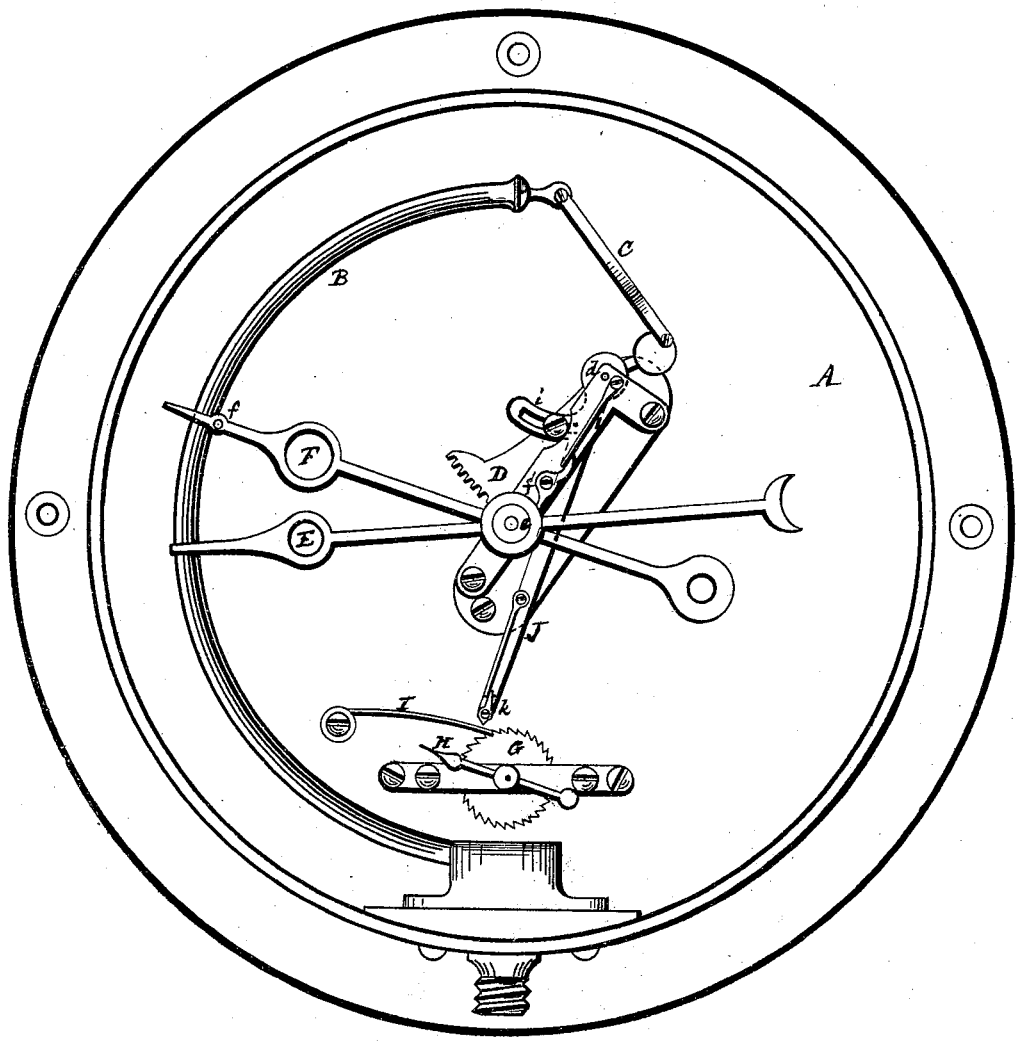

UNITED STATES PATENT OFFICE.

EDWARD H. ASHCROFT, OF BOSTON, MASSACHUSETTS.

IMPROVEMENT IN REGISTERING STEAM-GAGES.

Specification forming part of Letters Patent No. 141,307, dated July 29, 1873; application filed February 5, 1873.

*To all whom it may concern:*

Be it known that I, EDWARD H. ASHCROFT, of Boston, in the county of Suffolk and State of Massachusetts, have invented certain new and useful Improvements in Steam-Gages; and I do hereby declare the following to be a full, clear, and exact description of the invention, such as will enable others skilled in the art to which it pertains to make and use it, reference being had to the accompanying drawings, which form part of this specification.

My invention relates to those gages commonly known as register-gages, wherein it is intended to record the number of times that the indicator passes a fixed limit of pressure, as well as to record the maximum pressure.

In the drawings, Figure 1 is a view of my invention as applied to steam-gages.

A is the case which supports the gage mechanism, the dial-plate having been removed and the pointers or index-fingers replaced on their proper spindles. B is a spring, formed of hollow brass tubing, flattened in the usual manner. C is a bar connecting the free end of this tube with the end of the segment-lever D, which latter is pivoted at $d$, and communicates motion to the index-finger E by gearing into a pinion on the shaft $e$. F is the maximum-pressure indicator, which is driven loosely around the shaft $e$ by the action of the pointer E against a small pin, $f$. This maximum pointer is prevented from returning by the pawl $f'$, which operates against a ratchet-wheel secured to its center. This pawl offers sufficient pressure to prevent the pointer from shaking from its position. G is a registering-wheel for denoting, by means of the index-finger H, the number of times the pointer E has passed the prescribed limit of pressure. This wheel G is prevented from returning by the spring-pawl I, and the same pawl offers sufficient friction to prevent any motion of the wheel by jarring.

The foregoing is descriptive of the general parts and operation of the gage mechanism; but the particular invention I have made consists of the lever-arm J, provided with a gageable arm, $i$, or other suitable mechanism for causing it to act at a prescribed pressure, which lever J is attached directly to the segment-lever D. A suitable spring-pawl, $k$, on the end of this lever will, at the prescribed pressure, engage with the ratchet-wheel G, and in passing the prescribed limit will move the wheel one tooth or space, which is indicated on the dial by the pointer H. As the pressure is relieved the pawl rides back over the ratchet; and the operation is repeated at every passage of this prescribed limit of pressure. When the arm J is properly set for any prescribed pressure it is secured immovably to the segment-lever D.

I do not limit myself to the particular shape or form, nor to the exact mode of operation, of this lever-bar J; but What I do claim as new, and desire to secure by Letters Patent, is—

1. The lever-bar J for operating the registering-index H, and attached directly and solely to the segment-lever D, substantially as set forth and described.

2. The lever-bar J for operating the registering-index H at a prescribed limit of pressure, and provided with an adjustment, $i$, the lever and its adjustment both being attached to and carried solely by the segment-lever.

In testimony that I claim the foregoing I have hereunto set my hand this 5th day of February, 1873.

EDWARD H. ASHCROFT.

Witnesses:
 WELLS W. LEGGETT,
 EDM. F. BROWN.